United States Patent
Chai et al.

(10) Patent No.: US 9,880,597 B2
(45) Date of Patent: Jan. 30, 2018

(54) METHOD AND TERMINAL DEVICE FOR CONTINUOUS POWER SUPPLY TO EXTERNAL CARRIER

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Yu Zhou, Shanghai (CN); Wei Guo, Shanghai (CN); Xiangxiang Yan, Shanghai (CN)

(73) Assignee: China UnionPay Co., Ltd. (CN)

( * ) Notice: Subject to any disclaimer, the term of this patent is extended or adjusted under 35 U.S.C. 154(b) by 168 days.

(21) Appl. No.: 14/781,853

(22) PCT Filed: Apr. 11, 2014

(86) PCT No.: PCT/CN2014/075166
§ 371 (c)(1),
(2) Date: Oct. 1, 2015

(87) PCT Pub. No.: WO2014/166419
PCT Pub. Date: Oct. 16, 2014

(65) Prior Publication Data
US 2016/0054772 A1 Feb. 25, 2016

(30) Foreign Application Priority Data

Apr. 12, 2013 (CN) .......................... 2013 1 0126644

(51) Int. Cl.
*G06F 1/26* (2006.01)
*G06F 1/32* (2006.01)
*G06F 9/48* (2006.01)

(52) U.S. Cl.
CPC ................ *G06F 1/26* (2013.01); *G06F 1/266* (2013.01); *G06F 1/3234* (2013.01); *G06F 9/485* (2013.01)

(58) Field of Classification Search
None
See application file for complete search history.

(56) References Cited

U.S. PATENT DOCUMENTS

2004/0206822 A1 10/2004 Crandall
2006/0259649 A1* 11/2006 Hsieh .................... G06F 3/0227
710/8

(Continued)

FOREIGN PATENT DOCUMENTS

CN 1825248 A 8/2006
CN 1904913 A 1/2007

(Continued)

OTHER PUBLICATIONS

First Office Action corresponding to Chinese Application No. 201310126644.0 dated Nov. 3, 2015.

(Continued)

*Primary Examiner* — Paul J Yen

(57) ABSTRACT

The invention discloses a method and terminal device for continuously supplying power to external element. The method comprises the following steps: when a terminal device switches from a first operating system to a second operating system, a proxy external element application is generated in the second operating system so that the proxy external element application is associated with an external element; by means of this proxy external element application, the external element which is associated with the application in the first operating system before the above switch operation is continuously supplied with power after the above switch operation.

12 Claims, 1 Drawing Sheet

(56) References Cited

U.S. PATENT DOCUMENTS

| | | | |
|---|---|---|---|
| 2007/0220276 A1* | 9/2007 | Croxford | G06F 12/145 |
| | | | 713/193 |
| 2008/0000989 A1 | 1/2008 | Chen et al. | |
| 2008/0077420 A1* | 3/2008 | Cromer | G06F 21/10 |
| | | | 705/307 |
| 2008/0184042 A1* | 7/2008 | Parks | G06F 1/3203 |
| | | | 713/300 |
| 2013/0227270 A1* | 8/2013 | Ting | G06F 9/4411 |
| | | | 713/100 |

FOREIGN PATENT DOCUMENTS

| | | |
|---|---|---|
| CN | 102122250 A | 7/2011 |
| CN | 102236816 A | 11/2011 |
| CN | 102541690 A | 7/2012 |
| EP | 2034401 A1 | 3/2009 |
| WO | WO 97-30385 A1 | 8/1997 |

OTHER PUBLICATIONS

Extended European Search Report for corresponding EP Application No. 14783048.3, dated Nov. 4, 2016.
International Search Report corresponding to International Application No. PCT/CN2014/075166 dated Aug. 4, 2014.

\* cited by examiner

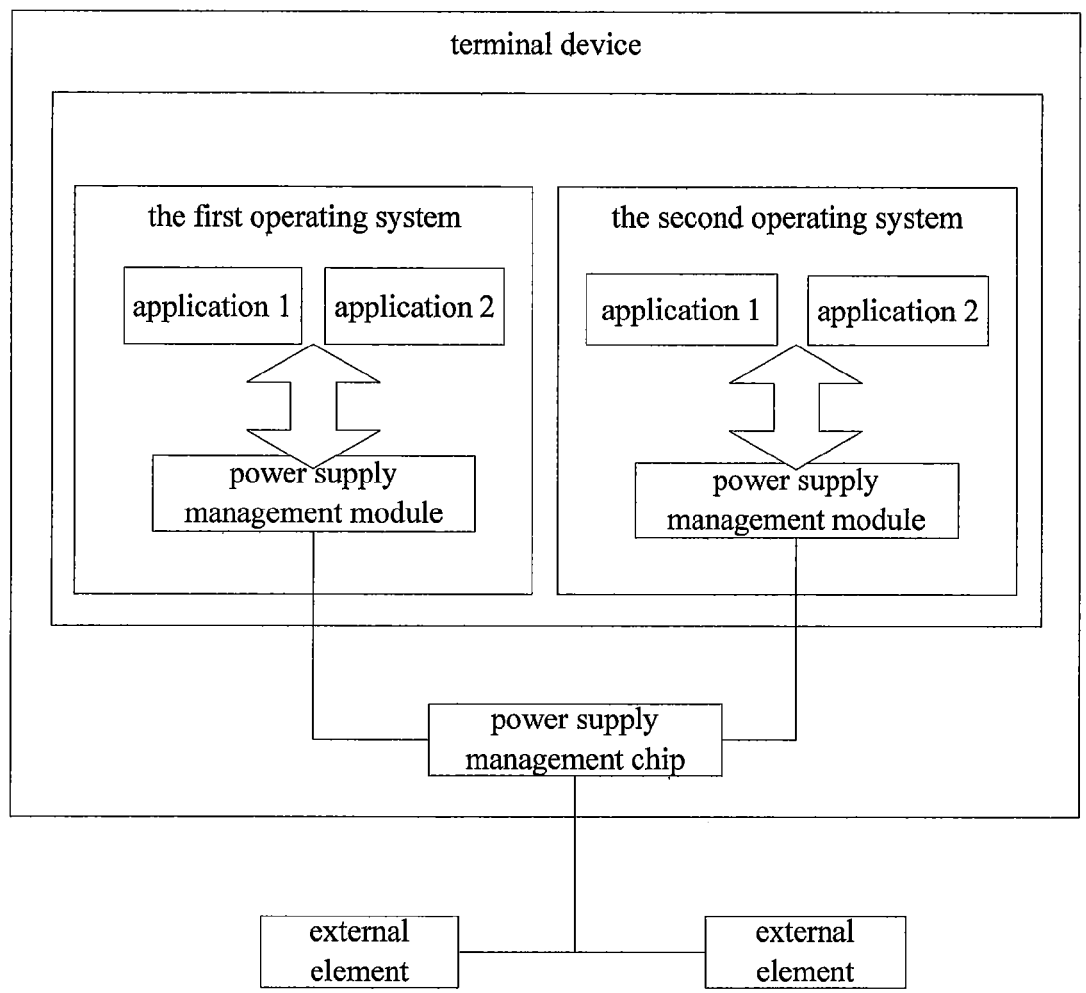

METHOD AND TERMINAL DEVICE FOR CONTINUOUS POWER SUPPLY TO EXTERNAL CARRIER

RELATED APPLICATIONS

This application is a 35 U.S.C. §371 national phase application of PCT Application PCT/CN2014/075166 filed Apr. 11, 2014 which claims priority to Chinese Application No. 201310126644.0 filed Apr. 12, 2013. The entire content of each is incorporated herein by reference in its entirety.

FIELD OF THE INVENTION

The invention relates to the technology of supplying power to external element, and in particular, to a method and terminal device for continuously supplying power to external element.

BACKGROUND

When a power supply management module in existing terminal devices (e.g., cell phone, tablet computer) supplies power to external element (e.g., smart card, SD card), a power supplying strategy is adopted for the purpose of saving the power, in which power is on during use and power is off automatically when the external element is not in-use for a long time. However, this auto power-off strategy has a hidden danger in case two systems co-exist. For example, when an application of one operating system is using an external element, since this operating system is temporarily switched to another operating system so that power is off, an unexpected abnormality of the external element will be caused. Especially, a switch between a secure operating system running in a trusted execution environment and a multimedia operating system running in an untrusted execution environment will make secure element previously associated with the secure operating system power-off.

Therefore, there is a need for a method and terminal device for continuously supplying power to external element.

SUMMARY OF THE INVENTION

According to an object of the invention, a method for continuously supplying power to external element is disclosed which comprises the following steps:

when a terminal device switches from a first operating system to a second operating system, a proxy external element application is generated in the second operating system so that the proxy external element application is associated with an external element; by means of this proxy external element application, the external element which is associated with the application in the first operating system before the above switch operation is continuously supplied with power after the above switch operation.

Preferably, the proxy external element application is associated with the external element via external element port information.

Preferably, the external element port information is contained in a system switch command of a terminal device for switching from the first operating system to the second operating system.

Preferably, the proxy external element application sends the external element port information to a power supply management module of the second operating system so that the power supply management module of the second operating system controls a power supply management chip of the terminal device to continuously supply power to the external element.

Preferably, the first operating system is a secure operating system running in a trusted execution environment.

Preferably, the second operating system is a multimedia operating system running in an untrusted execution environment.

Preferably, the external element is a smart card or a smart SD card.

According to another object of the invention, a terminal device for continuously supplying power to external element is disclosed, the terminal device can operate a first operating system and a second operating system, the terminal device is configured to:

generate a proxy external element application in a second operating system when a first operating system is switched to the second operating system so that the proxy external element application is associated with an external element; by means of this proxy external element application, the external element which is associated with the application in the first operating system before the above switch operation is continuously supplied with power after the above switch operation.

Preferably, the proxy external element application is associated with the external element via external element port information.

Preferably, the external element port information is contained in a system switch command of a terminal device for switching from the first operating system to the second operating system.

Preferably, the terminal device sends the external element port information to a power supply management module of the second operating system via the proxy external element application so that the power supply management module of the second operating system controls a power supply management chip of the terminal device to continuously supply power to the external element.

Preferably, the first operating system is a secure operating system running in a trusted execution environment.

Preferably, the second operating system is a multimedia operating system running in an untrusted execution environment.

Preferably, the external element is a smart card or a smart SD card.

The invention is advantageous in that during a switch from a trusted execution environment to an untrusted execution environment, for example, the terminal device can prevent a secure element in use from being powered-off accidentally leading to disconnection.

BRIEF DESCRIPTION OF THE DRAWINGS

Those skilled in the art will know various aspects of the invention more clearly upon reading the specific embodiments of the invention with reference to the accompanying drawings. Those skilled in the art will understand that these drawings are merely provided for explaining the technical solutions of the invention in cooperation with the specific embodiments, rather than limiting the scope of protection of the invention, wherein:

FIG. 1 is a schematic view of a terminal device for continuously supplying power to an external element according to an embodiment of the invention.

DETAILED DESCRIPTION OF THE INVENTION

Specific embodiments of the invention will be further described in detail hereinafter with reference to the accompanying drawings. In the following description, for the purpose of illustration, many specific details are set forth in order to provide a thorough understanding of one or more aspects of the embodiments. However, it is apparent to those skilled in the art that one or more aspects of individual embodiments can be carried out with less of these specific details. Therefore, the following description should not be taking as limiting; instead, the scope of protection is defined by the appended claims.

FIG. 1 is a schematic view of a terminal device for continuously supplying power to an external element according to an embodiment of the invention. As shown in FIG. 1, the terminal device can operate a first operating system and a second operating system. The first operating system and the second operating system can have a power supply management module respectively. The power supply management modules are connected to a power supply management chip, and external elements are coupled to the power supply management chip. While only two external elements are shown in the drawing, it will be appreciated that the power supply management chip can supply power to two or more external elements. The external elements can be secure elements.

According to the embodiment of the invention, the terminal device can be configured to generate a proxy external element application in the second operating system when a first operating system is switched to the second operating system so that the proxy external element application is associated with an external element; by means of this proxy external element application, the external element which is associated with the application in the first operating system before the above switch operation is continuously supplied with power after the above switch operation. The proxy external element application can be associated with the external element via external element port information. The external element port information is contained in a system switch command of the terminal device for switching from the first operating system to the second operating system. The terminal device can send the external element port information to the power supply management module of the second operating system via the proxy external element application so that the power supply management module of the second operating system controls the power supply management chip of the terminal device to continuously supply power to the external elements.

Here, the first operating system can be a secure operating system running in a trusted execution environment. The second operating system can be a multimedia operating system running in an untrusted execution environment. The external elements are secure elements such as a smart card or a smart SD card, etc.

Therefore, through a secure element proxy application in an untrusted execution environment, for example, the embodiment of the invention continuously supplies power to the secure elements, and prevents the occurrence of an abnormality in which the terminal device makes the secure elements be powered-off and disconnected when the secure operating system in a trusted execution environment switches to a multimedia operating system in an untrusted execution environment, for example.

Through the description of the above embodiments, those skilled in the art will be able to understand that various modifications and replacements can be also made to the specific embodiments of the invention without departing from the spirit and scope of the invention. These modifications and replacements will all fall within the scope defined by the appended claims of the invention.

The invention claimed is:

1. A method for continuously supplying power to an external element, comprising:
   when a terminal device switches from a first operating system of the terminal device to a second operating system of the terminal device, a proxy external element application is generated in the second operating system so that the proxy external element application is associated with the external element;
   by means of the proxy external element application, the external element which is associated with an application in the first operating system before the switch operation is continuously supplied with power after the switch operation;
   wherein the first operating system is coupled to the external element via a first connection path that does not include the second operating system and the second operating system is coupled to the external element via a second connection path that does not include the first operating system; and
   wherein port information corresponding to the external element for supplying power thereto is contained in a system switch command of a terminal device for switching from the first operating system to the second operating system.

2. The method according to claim 1, wherein the proxy external element application is associated with the external element via external element port information.

3. The method according to claim 2, wherein the proxy external element application sends the external element port information to a power supply management module of the second operating system so that the power supply management module of the second operating system controls a power supply management chip of the terminal device to continuously supply power to the external element.

4. The method according to claim 1, wherein the first operating system is a secure operating system running in a trusted execution environment.

5. The method according to claim 1, wherein the second operating system is a multimedia operating system running in an untrusted execution environment.

6. The method according to claim 1, wherein the external element is a smart card or a smart SD card.

7. A terminal device having a first operating system and a second operating system for continuously supplying power to an external element, the terminal device being configured to:
   generate a proxy external element application in the second operating system when the first operating system of the terminal device is switched to the second operating system of the terminal device so that the proxy external element application is associated with the external element; by means of the proxy external element application, the external element which is associated with an application in the first operating system before the switch operation is continuously supplied with power after the switch operation;
   wherein the first operating system is coupled to the external element via a first connection path that does not include the second operating system and the second operating system is coupled to the external element via a second connection path that does not include the first operating system; and wherein port information corresponding to the external element for supplying power thereto is contained in a system switch command of a terminal device for switching from the first operating system to the second operating system.

8. The terminal device according to claim 7, wherein the proxy external element application is associated with the external element via external element port information.

9. The terminal device according to claim 8, wherein the terminal device sends the external element port information to a power supply management module of the second operating system via the proxy external element application so that the power supply management module of the second operating system controls a power supply management chip of the terminal device to continuously supply power to the external element.

10. The terminal device according to claim 7, wherein the first operating system is a secure operating system running in a trusted execution environment.

11. The terminal device according to claim 7, wherein the second operating system is a multimedia operating system running in an untrusted execution environment.

12. The terminal device according to claim 7, wherein the external element is a smart card or a smart SD card.

* * * * *

UNITED STATES PATENT AND TRADEMARK OFFICE
CERTIFICATE OF CORRECTION

| | | |
|---|---|---|
| PATENT NO. | : 9,880,597 B2 | Page 1 of 1 |
| APPLICATION NO. | : 14/781853 | |
| DATED | : January 30, 2018 | |
| INVENTOR(S) | : Chai et al. | |

It is certified that error appears in the above-identified patent and that said Letters Patent is hereby corrected as shown below:

On the Title Page

Item (74) Attorney, Agent, or Firm: Please add -- Myers Bigel, P.A. --

Signed and Sealed this
Seventh Day of August, 2018

Andrei Iancu
*Director of the United States Patent and Trademark Office*